(12) United States Patent
Charon et al.

(10) Patent No.: US 7,692,104 B2
(45) Date of Patent: Apr. 6, 2010

(54) ATTACHMENT SYSTEM FOR CABLES AND SUPPORT FOR CABLES USED IN AERONAUTIC CONSTRUCTION

(75) Inventors: Pierre Charon, Toulouse (FR); Pierre-Alain Boeuf, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/838,914

(22) Filed: Aug. 15, 2007

(65) Prior Publication Data
US 2008/0156529 A1    Jul. 3, 2008

(30) Foreign Application Priority Data
Aug. 18, 2006    (FR)    ................................ 06 07380

(51) Int. Cl.
*H02G 3/04* (2006.01)
(52) U.S. Cl. ................ 174/481; 174/480; 174/72 C; 174/135; 248/68.1; 211/26.2
(58) Field of Classification Search .............. 174/480, 174/481, 72 C, 101, 72 A, 135, 99 R; 248/49, 248/53, 68.1; 211/26.2
See application file for complete search history.

(56) References Cited

U.S. PATENT DOCUMENTS

| | | | | |
|---|---|---|---|---|
| 3,761,603 A | * | 9/1973 | Hays et al. | .................. 174/101 |
| 5,134,250 A | * | 7/1992 | Caveney et al. | ............. 174/101 |
| 5,278,356 A | * | 1/1994 | Miller | ..................... 174/117 A |
| 5,401,905 A | | 3/1995 | Lesser et al. | |
| 5,535,787 A | * | 7/1996 | Howell | ....................... 138/167 |
| 6,180,886 B1 | * | 1/2001 | Krane et al. | ................ 174/72 A |
| 6,254,041 B1 | * | 7/2001 | Dufourg | ........................ 248/65 |
| 6,455,777 B1 | * | 9/2002 | Laukhuf | ..................... 174/68.3 |
| 2002/0117321 A1 | | 8/2002 | Beebe et al. | |

FOREIGN PATENT DOCUMENTS

| | | |
|---|---|---|
| EP | 0 184 931 | 6/1986 |
| EP | 0 555 687 | 8/1993 |
| GB | 2 159 669 | 12/1985 |

OTHER PUBLICATIONS

U.S. Appl. No. 11/837,705, filed Aug. 13, 2007, Charon, et al.

* cited by examiner

*Primary Examiner*—Dhiru R Patel
(74) *Attorney, Agent, or Firm*—Oblon, Spivak, McClelland, Maier & Neustadt, L.L.P.

(57) ABSTRACT

This cable-fastening system is intended to maintain cables (4) in a longitudinally extending housing (10) having an aperture through which cables (4) can be introduced into the housing (10).

It has the form of a flexible sheet (16) of elongated shape, provided on its two longitudinal rims with fastening intended to cooperate with complementary fastening.

A cable support according to the invention is provided with a metal profiled structure (2) having at least one housing (10) intended to receive cables (4) or similar components, and also with such a fastening system (16).

19 Claims, 1 Drawing Sheet

ATTACHMENT SYSTEM FOR CABLES AND SUPPORT FOR CABLES USED IN AERONAUTIC CONSTRUCTION

BACKGROUND OF THE INVENTION

1. Field of the Invention

The present invention relates to a cable-fastening system and to an associated cable support, especially for aeronautic construction.

2. Discussion of the Background

In an aircraft, it is known to use a cable support provided on the one hand with a structure inside which the supported cables are housed and on the other hand with a cover that encloses and maintains the cable assembly housed in the structure.

As an example, the structure is a profiled structure provided with a base plane, on one side of which there extend longitudinal walls perpendicular to the base and parallel to one another. Two neighboring longitudinal walls therefore form a throat ("channel" in English) intended to serve as the cable housing.

Each channel can be equipped with a cover, or else the same cover can cover a plurality of channels. As an example, each cover is maintained by a self-locking serrated rack system. Such a system is provided with a serrated rack, made of synthetic material, for example, extending from the base of the structure toward the open side of the channel. The cover is then provided with an aperture dimensioned in such a way that the serrated rack of synthetic material can pass through the aperture in one direction but not in the other. It is understood that the serrated rack is oriented in such a way that the cover can be displaced toward the bottom of the channel, or in other words toward the base of the structure.

The known cable support structure are generally made of metal. Such a support provides of diverse functions. Firstly it supports and mechanically protects cables and/or cable harnesses. By virtue of the presence of a plurality of channels, it also achieves physical separation of diverse cables. The cable support also provides heat removal by conduction and protection of the cables from electromagnetic interferences to which they may be exposed. In particular, this latter function obviates the need for excessive shielding of the cables.

Such cable supports nevertheless suffer from several disadvantages. Firstly it is noted that a plurality of serrated racks has to be provided inside the channels to maintain a corresponding cover in each case. These structures also lack flexibility. In fact, the profile used is a rigid profile, and when the cable route includes a zone that is not straight, the cables are therefore made to pass more or less openly between two cable supports. In such zones, the cables are then exposed to external electromagnetic interferences.

SUMMARY OF THE INVENTION

The object of the present invention is then to provide a flexible system with which continuity of the protection against electromagnetic interferences is advantageously assured.

To this end, the present invention proposes a cable-fastening system intended to maintain cables in a longitudinally extending housing having an aperture through which cables can be introduced into the housing.

According to the present invention, this fastening system has the form of a flexible sheet of elongated shape, provided on its two longitudinal rims with fastening means intended to cooperate with complementary fastening means.

Such a flexible sheet can be used to prevent cables or cable harnesses from escaping from their housing. Such a sheet can be used for a single housing, or else one sheet can be provided to fasten all (or several) of the housings of a cable support.

A first embodiment provides that the fastening means of a longitudinal rim are provided either with loops or with hooks of a hook-and-loop fastening system. Such a system is known in particular under the trademark Velcro. It is a preferred embodiment by virtue of its ease of use, its reliability and the good maintaining ability achievable therewith. Nevertheless, it is perfectly conceivable to use snap fasteners.

In order that the fastening system makes it possible to achieve a shield against electromagnetic interferences, the sheet used is advantageously a composite sheet provided with a metal core.

The present invention also relates to a cable support intended in particular for aeronautic construction, provided with a metal profiled structure having at least one housing intended to receive cables or similar components, and also with a fastening system such as described hereinabove.

Such a cable support is such that, for example, each fastening system is provided on one longitudinal rim with fastening means complementary to the fastening means disposed on the other longitudinal rim. In this way, the fastening system can then have the form of a sheath, inside which there are placed cables or similar components or else harnesses. In such an embodiment, the fastening system is fixed at the bottom of a housing by adhesive bonding, for example, although it can also be fixed to the profiled structure by means of fixation lugs integral with the elongated sheet. Other methods for assuring the connection between the fastening system and the profiled structure can be envisioned.

In another embodiment, the profiled structure carries fastening means complementary to the fastening means of one longitudinal rim of the fastening system. The fastening system is then fixed on the profiled structure, thus maintaining cables or similar components enclosed therein.

To limit the weight of a cable support according to the present invention, the profiled structure is advantageously made of synthetic or composite material, if necessary covered partly or completely by a conductive metal layer.

Finally, the present invention also relates to an aircraft, characterized in that it is provided with a cable support such as described hereinabove.

BRIEF DESCRIPTION OF THE DRAWINGS

Details and advantages of the present invention will become clearer from the description hereinafter, provided with reference to the attached schematic drawings, wherein.

DETAILED DESCRIPTION OF THE PREFERRED EMBODIMENTS

Figure 1:
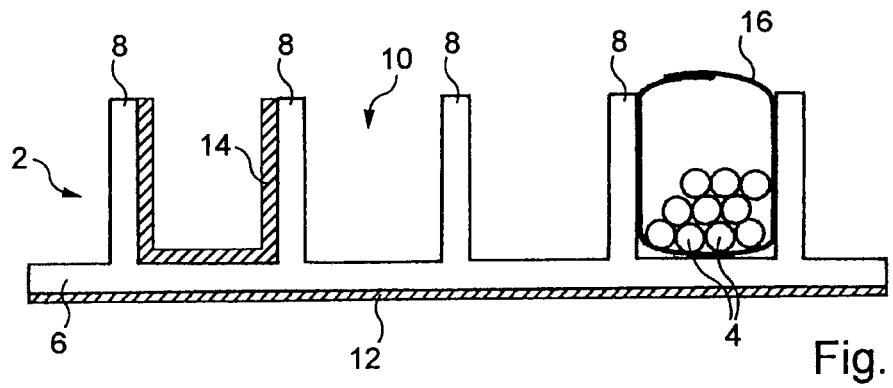
FIG. 1 is a view in transverse section of an aircraft cable support according to the invention.

The drawings represent a cable support provided on the one hand with a structure 2 intended to house cables 4 and on the other hand with means for maintaining cables 4 in their housing.

Structure 2 is a metal structure provided with a base plate 6 and longitudinal walls 8. It will be assumed, for example, in the description hereinafter, that base plate 6 extends in a horizontal plane, while the longitudinal walls are disposed in a vertical plane. Base plate 6 and longitudinal walls 8 form a metal profile of length adapted to the surrounding constraints.

Longitudinal walls 8 all extend perpendicular to base plate 6 on the same side thereof. They are parallel to one another and, in the illustrated embodiment, they are equidistant and distributed over base plate 6. Thus two neighboring longitudinal walls 8 together with base plate 6 define a channel-shaped housing 10 extending over the entire cable support length.

This structure 2 is a structure made of electrically conductive metal. It permits mechanical protection and physical separation of cables 4 and also makes it possible to provide a return path for the current flowing in cables 4. The fact that profiled structure 2 is intended to be used to provide a return path for the current makes it possible to improve the susceptibility to ground loops (the outgoing wires being as close as possible to the return path achieved by structure 2) and to achieve a low parasitic inductance.

To insulate structure 2, it is provided that base plate 6 will be covered on the side opposite longitudinal walls 8 with a layer of insulating material 12. This layer can be, for example, a layer of synthetic material (such as polyvinyl fluoride) overmolded onto the base plate, or it can be a coat of varnish deposited on that plate.

It is also possible to provide a layer of insulating material 14 in each housing 10. In FIG. 1, only one layer of insulating material 14 is illustrated for a single housing 10. Of course, all housings 10 can receive such a layer of insulating material 14. This layer is a continuous layer covering each longitudinal wall 8 as well as the bottom of housing 10 formed by part of the upper face of base plate 6 (it is assumed here that the layer of insulating material 12 covers the lower face of base plate 6).

Figure 2:
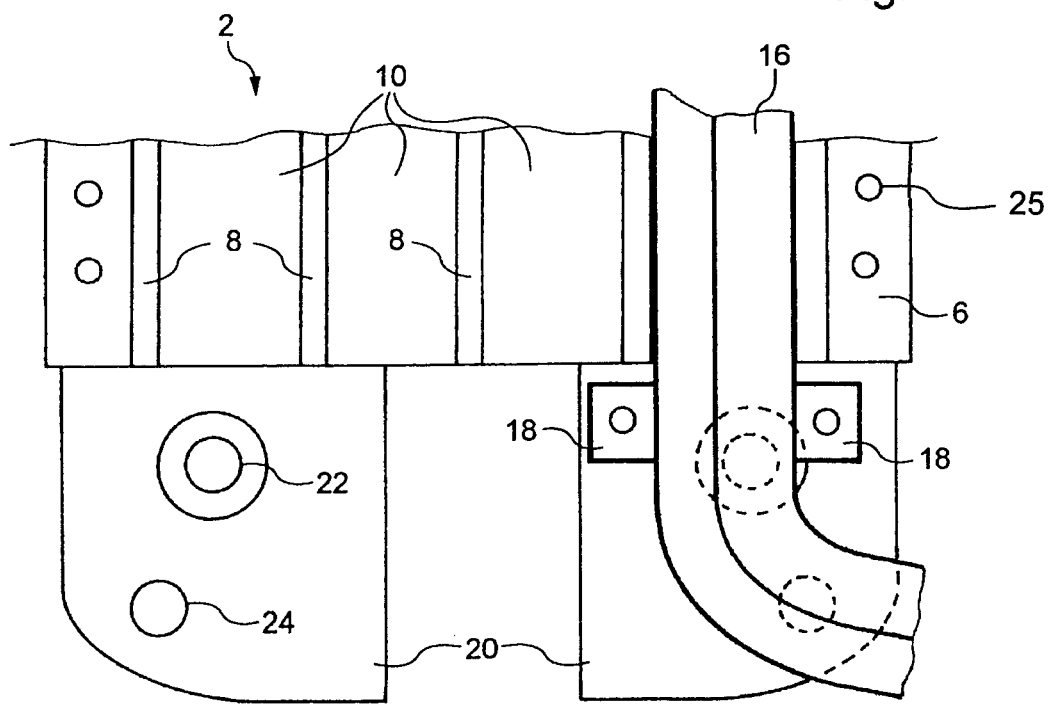
FIG. 2 is a view from above of one end of the support of FIG. 1, and FIG. 3 corresponds to FIG. 1 for an alternative embodiment of a support according to the invention.

In the embodiment of FIGS. 1 and 2, cables 4 are maintained inside their housing 10 by a fastening system 16.

In this first embodiment, fastening system 16 has the form of a flexible tubular sheath. This sheath has an aperture along a longitudinal edge. A hook-and-loop fastening system of the type of fastening systems sold under the trademark Velcro is advantageously used here to fasten the sheath of fastening system 16 over its entire length. This sheath has a conductive core. Thus this sheath makes it possible to achieve protection of cables 4 against electromagnetic interferences. By using such a fastening system 16 with metal core, there is no need to provide a layer of insulating material 14 in housings 10.

The sheath of fastening system 16 has the advantage that it can be prolonged beyond the structure of a cable support. Thus a given fastening system 16 can be prolonged over a plurality of profiles forming a cable support. Cables 4 are then protected over their entire length, even while passing from one profiled structure 2 to another.

A fastening system 16 can be fixed in different ways in a housing 10. As an example, the sheath of fastening system 16 can be bonded adhesively to the inside of a housing 10 against base plate 6 and/or one or two longitudinal walls 8. Fixation lugs 18 can be provided instead of or in addition to the applied adhesive bonding. FIG. 2 shows an example of fixation lugs 18. At the end of a structure 2 of a cable support, the sheath of fastening system 16 is provided laterally on both sides with a fixation lug 18 of substantially rectangular shape. A bore is then provided in each fixation lug 18 to permit fixation thereof to structure 2.

As can be seen in FIG. 2, base plate 6 of structure 2 has, at its ends, two feet 20 that extend in the prolongation of base plate 6. In the illustrated embodiment, there is provided in each foot 20 a first bore 22 to fix structure 2 against a wall, for example, as well as a second bore 24, with which metal structure 2 can be connected to another metal structure 2 by means, for example, of a metal braid (not illustrated).

It is also evident in FIG. 2 that base plate 6 has bores 25 close to its longitudinal rims. These bores are distributed regularly along these rims. They can be used for fixation of a secondary current-return system (grounding) or for connecting the support electrically to other equipment items (bonding). These bores 25 also contribute to making structure 2 more lightweight.

Figure 3:
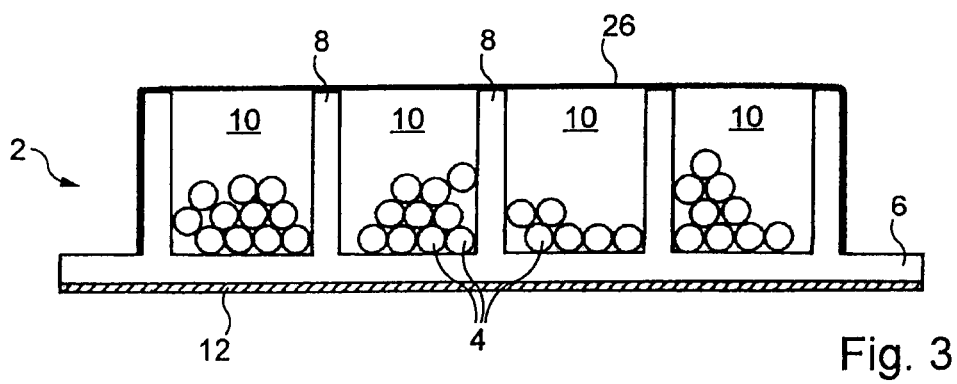

FIG. 3 shows an alternative embodiment of the invention. In this case, maintenance of cables 4 inside housings 10 of structure 2 is provided by a flexible cover 26. This cover is also fixed on structure 2 by means, for example, of a hook-and-loop fastening system sold under the trademark Velcro. In one embodiment, it can be provided that the outer faces of end longitudinal walls 8 are covered with a sheet bearing hooks (or loops). Flexible cover 26 then in turn has a face covered with loops (or hooks). Like the sheath of fastening system 16 of FIGS. 1 and 2, this cover 26 is made of a composite material provided with a conductive metal core. In this preferred embodiment, flexible cover 26 itself also makes it possible to provide protection of the cables against electromagnetic interferences. The free ends of longitudinal walls 8 can themselves also have hooks (or loops) to permit fixation of flexible cover 26.

A support such as described hereinabove can be used to conduct the current. It therefore makes it possible to provide a return path for the current carried by the cables 4 that it supports.

The systems making it possible to maintain cables 4 in their housing 10 are on the one hand very easy to use and on the other hand lighter than the traditionally used covers, while also being just as effective as the latter. These devices, which permit cables 4 to be maintained in their housing 10, also achieve protection against electromagnetic interferences when they are provided with a metal core.

The invention described hereinabove therefore makes it possible to retain the advantages of cable supports used traditionally in an aircraft, while offering advantages in terms both of protection against electromagnetic interferences and of weight. The cost price of a cable support according to the invention may even be lower than the cost price of a prior art cable support.

The present invention is not limited to the embodiments described above by way of non-limitative examples. It also relates to all variations of construction conceivable by the person skilled in the art within the scope of the appended claims.

Thus it is conceivable here that the weight of the cable support could be reduced by making its structure of a synthetic or composite material that is not electrically conductive. For better protection against electromagnetic interferences, and also to favor heat dissipation by thermal conduction if necessary, it is possible, for example, to provide for covering the structure of synthetic or composite material with a conductive film of copper or aluminum. As an example, such a film can be deposited on all or part of the external surface of the cable support structure by a vacuum metallization method or by electrolytic deposition.

The invention claimed is:
1. A cable support, comprising:
   a profiled structure having at least one longitudinally extending housing configured to receive cables and defining an opening between longitudinal walls of the housing through which said cables can be introduced into the housing, and a cable-fastening system configured to maintain the cables in the housing, wherein the cable-fastening system includes a flexible sheet of elongated shape and the cable-fastening system is configured to fasten ends of said flexible sheet extending in a longitudinal direction to each other, wherein the profiled structure is electrically conductive and provides a return path for a current flowing in said cables along a length of the structure, and the flexible sheet is a composite sheet with a metal core to provide protection for the cables against electromagnetic interferences.

2. A cable support according to claim 1, wherein the ends of the sheet extending in the longitudinal direction are fastened with either loops or hooks of a hook-and-loop system.

3. A cable support according to claim 1, wherein each end of the sheet extending in the longitudinal direction is connected to a fastener such that fasteners on opposite ends are complementary to each other.

4. A cable support according to claim 3, wherein the cable-fastening system is fixed at a bottom of the housing by adhesive bonding.

5. A cable support according to claim 3, wherein the fastening system is fixed to the profiled structure by fixation lugs integral with the elongated sheet.

6. A cable support according to claim 1, wherein the profiled structure includes structural fasteners configured to fasten said cable-fastening system to said profile structure, wherein said structural fasteners are complementary to the fasteners configured to fasten the ends to each other.

7. A cable support according to claim 1, wherein the profiled structure is made of synthetic or composite material.

8. A cable support according to claim 7, further comprising a conductive metal layer that at least partially covers said profiled structure.

9. A cable support according to claim 1, wherein the support is configured to be used in an aircraft.

10. A cable support according to claim 1, wherein the housing of the profiled structure is defined by a base plate and the longitudinal walls separated by said base plate, wherein said flexible sheet covers said base plate and said longitudinal walls, such that at least a number of the cables received in the housing contact said flexible sheet.

11. A cable support according to claim 10, wherein said base plate and longitudinal walls have ends such that said cables extend longer than said ends of the base plate and the longitudinal walls, and wherein said flexible sheet extends longer than said ends of the base plate and the longitudinal walls to provide support for said cables beyond said ends of the base plate and the longitudinal walls.

12. A cable support according to claim 10, wherein said base plate includes a first face facing said opening and a second face opposite said first face, and wherein said second face of said base plate is covered by an insulating material.

13. A cable support according to claim 1, wherein the profiled structure is covered on a side opposite the at least one longitudinally extending housing with a layer of insulating material to insulate the structure.

14. A cable support according to claim 1, wherein each housing of the at least one longitudinally extending housing is covered with a layer of insulating material to insulate the housing.

15. A cable support, comprising:

a profiled structure having at least one longitudinally extending housing configured to receive cables and defining an opening between longitudinal walls of the housing through which said cables can be introduced into the housing, and a cable-fastening system configured to maintain the cables in the housing, wherein the cable-fastening system includes a flexible sheet of elongated shape and the system is configured to fasten ends of said flexible sheet extending in a longitudinal direction to each other, wherein said flexible sheet has a core made of an electrically conductive material, the housing of the profiled structure is defined by a base plate, and the flexible sheet is a composite sheet with a metal core to provide protection for the cables against electromagnetic interferences.

16. A cable support according to claim 15, wherein said profiled structure is free of any layer of insulating material between said base plate and said flexible sheet.

17. A cable support, comprising:

a profiled structure having a plurality of parallel longitudinally extending housings, each housing being configured to receive cables and defining an opening between longitudinal walls of the housings through which said cables can be introduced into the housing, and a cable-fastening system configured to maintain the cables in the housings, wherein the cable-fastening system includes a flexible sheet of elongated shape that covers said plurality of housings, said flexible sheet having a first end being attached to a longitudinal wall of one of said housings and a second end being attached to a longitudinal wall of another one of said housings, such that said flexible sheet covers each opening of said plurality of housings in between the first end and the second end, wherein the flexible sheet is a composite sheet with a metal core to provide protection for the cables against electromagnetic interferences.

18. A cable support according to claim 17, wherein the profiled structure is covered on a side opposite the at least one longitudinally extending housing with a layer of insulating material to insulate the structure.

19. A cable support according to claim 17, wherein each housing of the at least one longitudinally extending housing is covered with a layer of insulating material to insulate the housing.

* * * * *